United States Patent [19]
Asghar

[11] Patent Number: 6,008,856
[45] Date of Patent: Dec. 28, 1999

[54] METHOD OF USING AN AUDIO TRANSMISSION SIGNAL TO TRANSMIT VIDEO DATA

[75] Inventor: Saf Asghar, Austin, Tex.

[73] Assignee: Advanced Micro Devices Inc., Sunnyvale, Calif.

[21] Appl. No.: 08/915,667

[22] Filed: Aug. 21, 1997

Related U.S. Application Data

[60] Provisional application No. 60/040,116, Mar. 7, 1997.

[51] Int. Cl.$^6$ ....................................................... H04N 7/04
[52] U.S. Cl. ........................... 348/462; 348/423; 348/467; 348/473; 348/17
[58] Field of Search ...................................... 348/484, 462, 348/463, 467, 473, 423, 729, 720, 14, 15, 17, 18, 515, 512; H04N 7/04

[56] References Cited

U.S. PATENT DOCUMENTS

| | | | |
|---|---|---|---|
| 5,091,936 | 2/1992 | Katznelson et al. | 380/19 |
| 5,396,497 | 3/1995 | Veltman | 348/423 |
| 5,598,352 | 1/1997 | Rosenau et al. | 395/806 |
| 5,668,601 | 9/1997 | Okada et al. | 348/423 |
| 5,719,634 | 2/1998 | Keery et al. | 348/463 |
| 5,726,989 | 3/1998 | Dokic | 370/509 |
| 5,742,361 | 4/1998 | Nakase et al. | 348/845 |
| 5,742,732 | 4/1998 | Kubo et al. | 386/95 |
| 5,751,356 | 5/1998 | Suzuki | 348/390 |
| 5,767,800 | 6/1998 | Machida et al. | 341/67 |
| 5,784,119 | 7/1998 | Noda et al. | 348/512 |
| 5,784,277 | 7/1998 | Meyer | 364/400.01 |

*Primary Examiner*—Michael H. Lee
*Assistant Examiner*—Jean W. Désir
*Attorney, Agent, or Firm*—Foley & Lardner

[57] ABSTRACT

A method of communicating a video image via an audio communication signal includes the steps of identifying, for a given pixel location of the video image, a set of samples within a stored audio signal having a corresponding bit pattern, generating a marker identifying the location of the given pixel in the video image, and multiplexing the stored audio signal and the marker such that the marker appears within the stored audio signal proximate to the set of samples having the corresponding bit pattern. This method can also include the steps of transmitting the multiplexed signal to a destination device, demultiplexing, at the destination device, to recover the marker and the corresponding bit pattern, illuminating a display at the given pixel location according to the corresponding bit pattern, and converting the corresponding bit pattern into an analog audio signal.

18 Claims, 9 Drawing Sheets

FIG. 4A

| | INTENSITY |
|---|---|
| 11 | VERY BRIGHT |
| 10 | BRIGHT |
| 01 | DULL |
| 00 | DARK |

FIG. 4B

| | COLOR |
|---|---|
| 11 | RED |
| 10 | BLUE |
| 01 | GREEN |
| 00 | WHITE |

FIG. 4C

| | COLOR & INTENSITY |
|---|---|
| 1111 | VERY BRIGHT RED |
| 1110 | VERY BRIGHT BLUE |
| 1101 | VERY BRIGHT GREEN |
| 1100 | VERY BRIGHT WHITE |
| 1011 | BRIGHT RED |
| 1010 | BRIGHT BLUE |
| 1001 | BRIGHT GREEN |

FIG. 7

| | | | 604 | 606 |
|---|---|---|---|---|
| | | | | |
| | | | | ~602 |
| | | | | |
| 701~ "303" | 0 0 0 0 1 1 1 1 | 1 0 0 1 1 1 1 1 | 1 1 0 1 1 1 1 1 | 0 0 1 1 1 1 1 1 ~608 |

OF PIXELS — 903

ROW 608

METHOD OF USING AN AUDIO TRANSMISSION SIGNAL TO TRANSMIT VIDEO DATA

This is a Continuation of provisional application Ser. No. 60/040,116 filing date Mar. 7, 1997.

BACKGROUND OF THE INVENTION

It is well-known to digitize an audio signal and transmit the digitized audio signal in digital form. Such an audio signal will be reconverted to an analog form at a receiving location by means of a digital to analog converter. A typical method of digitizing an analog audio signal includes sampling an analog audio signal 8,000 times per second (8 Khz), each sample taking the form of an 8 bit byte. Such an audio sampling method produces a 64 kilobit per second data stream. At a receive location, such a 64 kilobit per second data stream is reconverted into an analog signal for use in an audio application.

For example, FIG. 1 shows an audio signal 102 which can be digitized by an analog to digital converter. As is well-known, samples such as samples 104, 106, 108 and 110 can be taken to periodically measure the amplitude of the signal. In the example of FIG. 1, for example, the sampling rate can be 8,000 times per second, such that the width of each of the samples 104–110 is one eight-thousandth of a second. Each of the samples 104–110 can be represented by an 8 bit word corresponding to the magnitude of audio signal 102 at the sampling time. Table 1 shows an example of representative values for samples 104–110.

TABLE 1

| Sample | Value | Binary Value |
|---|---|---|
| 104 | 252 | 11111100 |
| 106 | 251 | 11111011 |
| 108 | 249 | 11111001 |
| 110 | 240 | 11110000 |

These values, which correlate to a vertical scale of audio signal 102 in as manner known in the art, can then be transmitted as part of a bit stream representing the audio signal. For example, the pattern shown in FIG. 2 shows a portion of a bit stream corresponding to samples 104, 106, 108 and 110. In a conventional digital audio communication system, samples 104, 106, 108 and 110 are transmitted digitally to a destination system which converts the samples into an analog signal by way of a digital to analog converter.

It is also well known that a video image, such as a display on a television screen or on a computer monitor, is made up of a large number of picture elements (pixels). For example, a typical display in a personal computer system is made of a matrix of pixels, such as a 360×240 matrix having 240 rows and 360 columns. FIG. 3 shows a magnification of a portion of video display 301, which includes various pixels, such as pixels 303 and 305. In this example, designators 307, 309 and 311 refer to the first, second and third rows of pixels within display 301, respectively. Similarly, designators 313, 315 and 317 refer to the first, second and third columns of pixels within display 301, respectively.

As is known in the art, each pixel within display 301 can be illuminated to one of a plurality of intensities and can have one of a plurality of colors. By providing differing intensities and colors to the various pixels within display 301, a video image can be created on display 301.

Further, it is known that information regarding the color and intensity of a given pixel can be digitally encoded such that a digital bit stream can be configured to represent a specific image.

In a simplified example, suppose each pixel within image 301 can be illuminated at one of four intensities and can have one of four colors. For example, suppose pixel 303, and each of the other pixels within display 301, can have one of the following four intensities: very bright; bright; dull; and dark. Further, presume pixel 303 can be illuminated at a selected one of the aforementioned intensities and can take any one of the following colors: red; blue; green; and white. In this example, one can encode the information corresponding to a given intensity and a given color by using four bits of digital data. For this simplified example, this concept can be seen by reviewing FIGS. 4A–4C. Here, FIG. 4A shows that each of the potential intensity levels can be characterized by two bits. FIG. 4B shows that each of the potential colors can similarly be characterized by two bits. FIG. 4C shows, for a subset of the possible combinations of intensities and colors from FIGS. 4A and 4B, that four bits of information can characterize a given state of a pixel. For example, if a pixel is to be illuminated to a very bright red state, the corresponding information is represented by 1111. Similarly, if a given pixel is to be illuminated to a bright blue state, the corresponding information can be represented by the digital sequence 1010.

Presuming that pixel 303 (FIG. 3) is to be illuminated to a very bright red state, and that pixel 305 is to be illuminated to a bright red state, a portion of a digital bit stream as shown in FIG. 5 can represent the information corresponding to the desired state of these two pixels. For example, segment 503 corresponds to the 1111 characterization of a very bright red pixel, and segment 505 corresponds to the 1011 bit representation for a bright red pixel. Regarding segment 505, one can see that since the bit stream is traveling in the direction of the arrow in FIG. 5, the highest order bit, which is in the first place of the segment, is at the rightmost portion of the segment. This is purely by way of example and not of limitation. If the sending and receiving devices operate under a different protocol, the leftmost bit of a segment can correspond to the highest order of the segment.

As described above, it is known to digitally encode information corresponding to the desired intensity and color of each pixel within a display such that, when this information is processed, the pixels of the display can be individually illuminated according to the corresponding portion of the information in order to produce a meaningful display. Also, as shown in FIG. 5, it is conventional to transmit the digital information corresponding to the pixels of a display in a predefined sequence in order to limit the amount of bits within the bit stream which must be allocated to overhead functions. In the example shown in FIG. 5, the information for pixel 303 is immediately followed by information from pixel 305. Thus, there is no need to provide extensive overhead to identify which pixel corresponds to the given information. Instead, a protocol is established which sets out a specific sequence of pixel information so that a display processor can process the information in order to create the display based on the information.

The example shown in FIGS. 4A–4C and 5 is an extremely simplified example merely for purposes for illustration. In modern digital video processing applications, a significantly greater number of bits are used to characterize each pixel's projected state. For example, 16-bit video is widely used, although new and future applications use 32-bit video. In these applications, the intensity and color of each pixel can take one of a great number of states. As a result, the image presented on the video display can be life-like, and even three-dimensional in quality.

SUMMARY OF THE INVENTION

Conventionally, an audio bit stream, such as that shown in FIG. 2, is transmitted separately from a corresponding video bit stream, such as that shown in FIG. 5. It is an object of the present invention to take advantage of the fact that both the audio and video information are reduced to digital form in order to transmit digital information which corresponds to both a portion of an audio bit stream and a portion of a video bit stream.

In one embodiment according to the invention, a method of communicating a video image via an audio communication signal includes the steps of identifying, for a given pixel location of the video image, a set of samples within a stored audio signal having a corresponding bit pattern. This method further includes the step of generating a marker identifying the location of the given pixel in the video image. Further, this method includes the step of multiplexing the stored audio signal and the marker such that the marker appears within the stored audio signal proximate to the set of samples having the corresponding bit pattern. The method according to this embodiment can further include the step of transmitting the multiplexed signal to a destination device which demultiplexes the signal to recover the marker and the corresponding bit pattern. The destination device can then illuminate a display at the given pixel location according to the corresponding bit pattern and can convert the corresponding bit pattern into an analog audio signal.

The method according to this embodiment can be repeated for each pixel location of the image such that a corresponding set of samples is identified for each pixel location of the image, a marker is generated for each pixel location of the image and the markers are multiplexed with the audio signal such that the marker generated for each pixel location of the image appears proximate to the corresponding set of samples.

In one variation of this embodiment according to the invention, each pixel location of the image can be uniquely associated with a corresponding set of samples. Alternatively, a set of samples may be associated with a plurality of pixel locations of the image. Also, a given set of samples may not meet the criteria to be associated with any specific pixel location of the image, in which case a null marker may be generated to appear proximate to such a set of samples.

In the variation wherein a set of samples is associated with a plurality of pixel locations, a count indicator can be generated to identify the number of pixel locations of the image associated with the bit pattern of the set of samples. The count indicator can appear proximate to the set of samples and markers associated with the plurality of pixel locations within the midstream.

In another variation of this embodiment, a direction identifier can be generated. The direction identifier, which may comprise a single bit, can identify a direction of the bit pattern of the set of samples. similarly, a logic sense identifier can be generated to identify a logical sense of the bits of the bit pattern.

Another embodiment according to the invention includes a method of communicating a video image via an audio communications signal which includes the step of identifying, for a given pixel cluster location of the video image, a set of samples within an audio signal that have a corresponding bit pattern. According to this embodiment, a marker can then be generated to identify the location of the given pixel cluster within the video image and the audio signal can be multiplexed with the marker such that the marker appears proximate to the set of samples having the corresponding bit pattern. In a variation of this embodiment, a start pixel identifier can be generated to identify a pixel within the pixel cluster which is the start pixel such that information in a first portion of the bit pattern corresponds to the start pixel. Further, a pattern identifier can be generated to identify a pattern within the pixel cluster in which pixels in the pixel cluster corresponds to portions of the bit pattern.

In still another embodiment according to the invention, a method of communicating a video image via an audio communication signal includes the step of identifying, for a given pixel location of the video image, a portion of a bit stream of a digitized audio signal having a corresponding bit pattern. This method can further include the step of generating a marker identifying the location of the given pixel and the step of multiplexing the digitized audio signal and the marker such that the marker appears within the bit stream. In one variation, the marker can be positioned in the bit stream proximate to the portion of the bit stream identified in the identifying step.

In still another embodiment according to the invention, a method of processing a digital bit stream includes the steps of decoding a portion of the bit stream to obtain audio information and decoding the portion of the bit stream to obtain video information. This method can further include the steps of converting the audio information into an analog audio signal and illuminating a pixel of a display according to the video information.

BRIEF DESCRIPTION OF THE DRAWINGS

These and other objects and advantages of the invention will be apparent from a review of the specification in light of the figures, wherein:

FIGS. 4A–4C show digital representations of intensity and color which can be used to represent a desired state of each pixel within the display of FIG. 3;

FIG. 7 shows a modification of the memory map of FIG. 6;

FIGS. 8A–8D show four alternative variations of a given bit pattern according to the invention;

FIG. 9 shows a bit stream according to the invention;

DETAILED DESCRIPTION OF THE PREFERRED EMBODIMENTS

One application of the invention is in a multimedia environment where information is stored, for example, in a CD-ROM storage device. For example, a user operating such a multimedia system can make a certain enquiry which causes the multimedia system to provide a given display with a corresponding audio output which explains the display to the user. Conventionally, the display information is stored in one location in a CD-ROM disk and the audio information is stored in another location in the CD-ROM disk. The multimedia system thus retrieves a bit stream corresponding to the stored audio information from the disk and converts it into an analog audio signal while simultaneously retrieving a bit stream corresponding to the stored video information from the disk and converting it into a video display. According to the present invention, two separate digital stores are not necessary. Instead, a single bit stream of audio information can be modified to include markers therein. Each of the markers can specify one or more pixel locations within the video image which should be illuminated according to a bit pattern within the audio bit stream which is identified by the marker.

Figure 1:
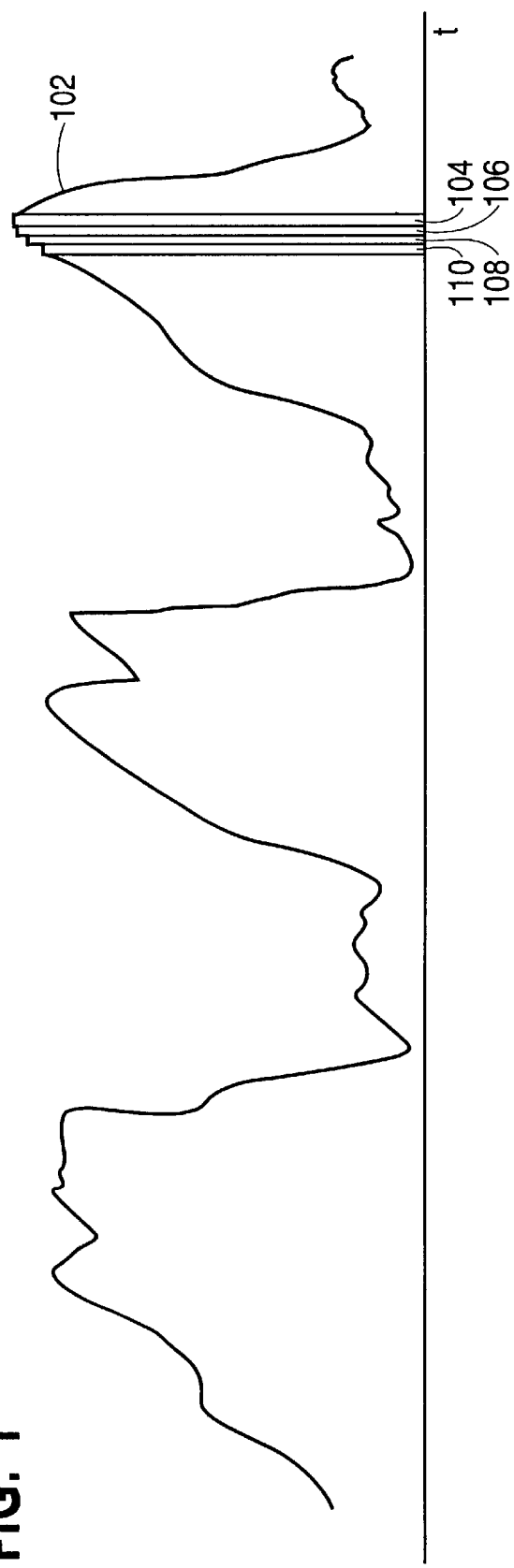
FIG. 1 shows an analog audio signal and a sampling process for converting the analog audio signal into digital samples.
Figure 2:
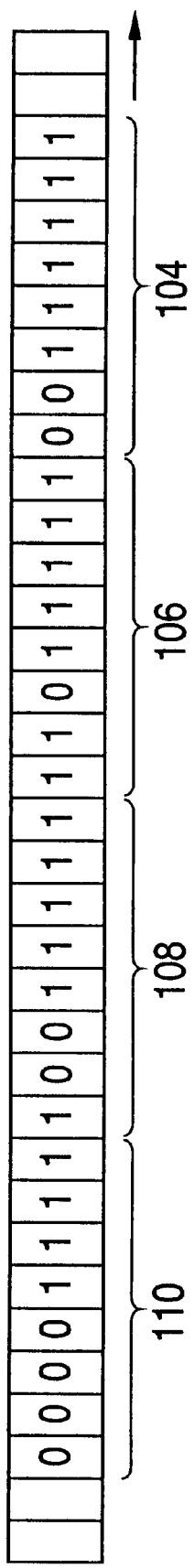
FIG. 2 shows exemplary digital samples from FIG. 1 configured in a bit stream.
Figure 6:
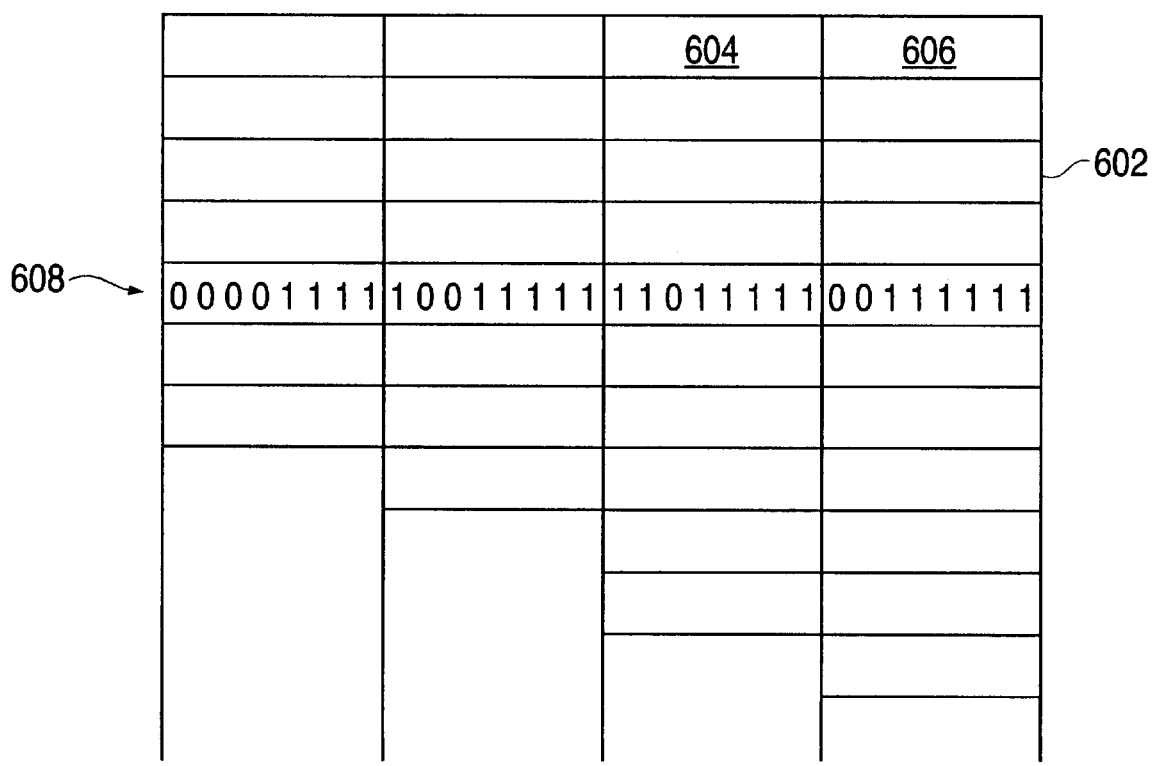
FIG. 6 shows a memory map according to the invention.

In one example, presume a digitized audio signal is stored within a memory map such as memory map 602 shown in FIG. 6. Memory map 602 is configured to have four columns of memory cells, such as memory cells 604 and 606. Each memory cell in memory map 602 can store an 8-bit byte corresponding to one sample of the audio signal. For example, presume the audio information shown in FIG. 2 is stored in the memory cells of row 608 as shown in FIG. 6. Further, presume the video portion of the multimedia system is highly sophisticated such that 32-bit video is being used. As can be seen in FIG. 6, each row, such as row 608, contains 32 bits of information. In the first embodiment according to the information, the audio information stored in memory map 602 can be multiplexed with markers to identify given pixels whose intensity and brightness information correspond to the bit pattern contained within a given row of the memory map.

Figure 3:
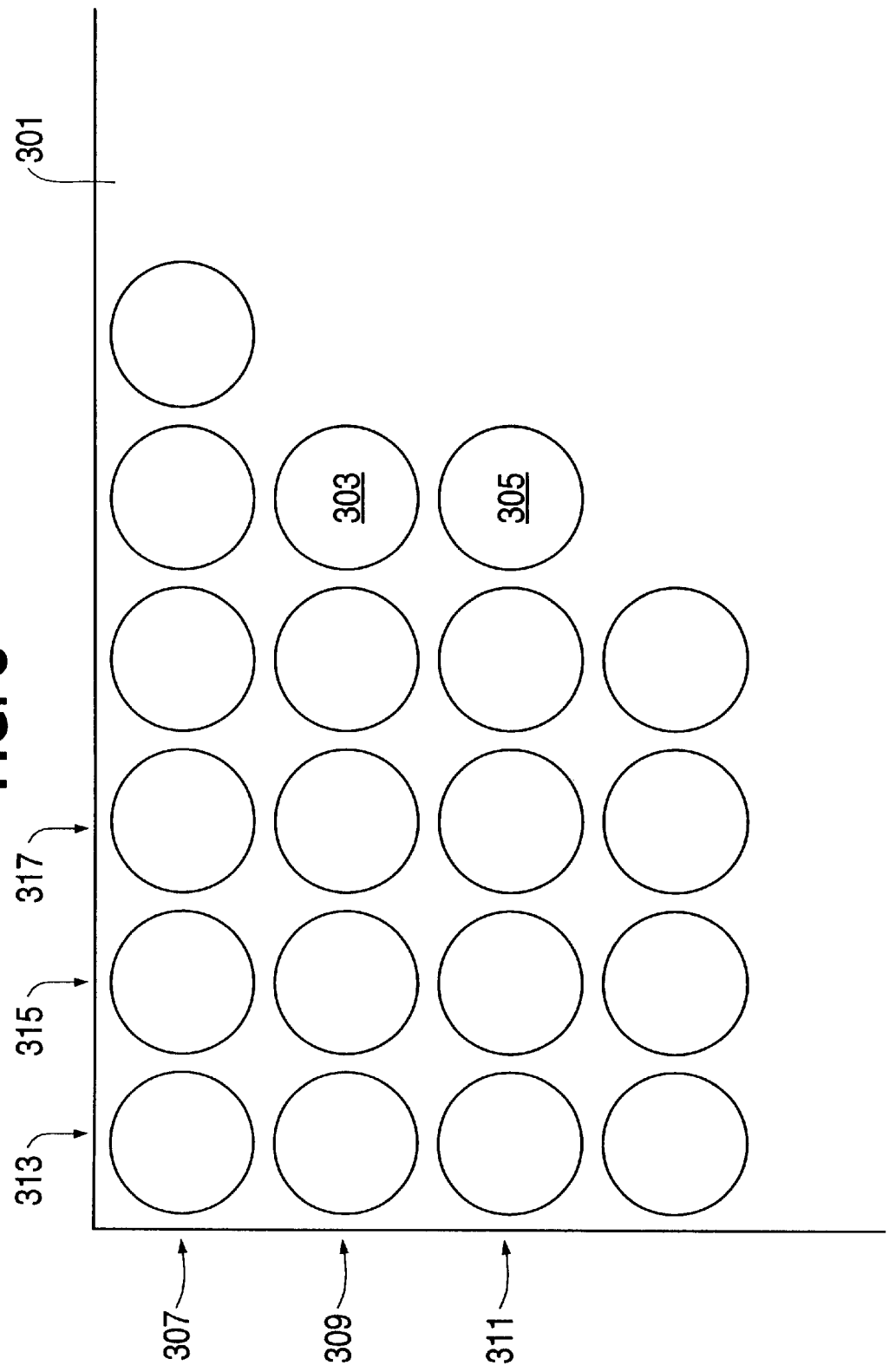
FIG. 3 shows a magnified view of picture elements (pixels) within a video display.
Figure 5:
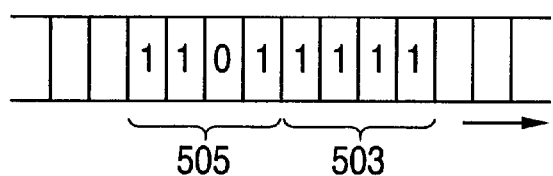
FIG. 5 shows an example of segments of the digital information of FIG. 4C configured within a bit stream.

For example, suppose the bit pattern of row 608 in FIG. 6 corresponds to a 32 bit pattern which describes the illumination characteristics required for pixel 303 (FIG. 3). As shown in FIG. 7, a marker identifying pixel 303 can be multiplexed into the bit stream stored in memory map 602 proximate to the 32-bit sequence of row 608. The marker 303 can, for example, identify pixel 303 in terms of row number and column number within the display 301. Presuming display 301 is a conventional 360×240 display, the row corresponding to pixel 303 can be identified using 8 bits and the column corresponding to pixel 303 can be identified using 9 bits. Thus, the marker 701 identifying pixel 303 as corresponding to the 32 bit stream of row 608 can comprise 17 bits of information. Thus, instead of using a 32 bit portion of a video bit stream to identify the brightness and intensity of pixel 303, only 17 bits, in the form of marker 701, need be incorporated into the audio stream to provide the same amount of information to the receiving device. As should be clear from this example, a smaller display or smaller window portion within a display which has fewer rows and columns, can be implemented by using an even smaller marker. For example, if a window of 64 rows and 64 columns within a corner of the display is to contain a video image, the corresponding marker for each pixel within the image need contain only 12 bits of information in order to specifically identify a given pixel. This 12-bits of information is a significant savings over the 32-bits of information which would be required via a conventional system.

As is clear from the above description, in order for the invention to operate properly, a corresponding bit pattern must be identified for each pixel within the display. This process can be simplified by the fact that a great majority of audio samples within an audio stream have a zero value corresponding to silence, while a great majority of pixel values can have a zero value corresponding to a given background state. Thus, by intelligently selecting the background value of the video display to correspond to the bit pattern of the audio signal which characterizes silence, a great number of the pixels can be quickly associated with corresponding bit patterns.

In additional variations, each bit pattern stored in memory map 602 can be viewed as being one of four possible bit patterns. For example, the bit pattern shown in row 608 can be read in either a left-to-right direction or in a right-to-left direction. Depending upon which direction is used, a different bit pattern results. Further, the logic sense of the bit pattern in row 608 can have either a positive logic sense corresponding to that shown in row 608 or a negative logic sense wherein each bit is the inverse of that shown in row 608. These variations are shown in FIGS. 8A–8D, wherein FIG. 8A corresponds to the bit stream of row 608 read in a left-to-right direction, FIG. 8B corresponds to the bit stream in row 608 read in a right-to-left direction. FIG. 8C corresponds to the inverse of the pattern of FIG. 8A and FIG. 8D corresponds to the inverse of the pattern of FIG. 8B. One row in the memory map 602 can therefore be used as a corresponding bit stream for a pixel having one of four bit patterns. For this variation to work properly, the marker corresponding to the bit pattern must contain a two-bit field identifying the direction (one bit) and the logical sense (one bit). Thus, instead of a 15 bit marker as described in the above example for a full 360×240 display, a 17-bit marker can be employed. The trade-off for the larger marker is faster processing time in matching bit patterns within the audio samples stored in the memory map and the bit streams corresponding to the pixels. Similarly, in the example of the 64×64 window, the two additional bits which are used to identify direction and sense can be employed, yielding a 14-bit marker instead of a 12-bit marker.

It should also be clear that only one of the direction and sense variables can be employed. For example, if only the direction variable is employed, then only one additional bit need be added to the marker to yield two potential bit patterns for each row in the memory map.

In addition to providing markers to correspond with the rows in the memory map 602, a null marker can be created to identify rows of the memory map 602 for which no corresponding pixel locations exist. The null marker can then be read by a processor to inform the processor that the corresponding bit pattern should be reconfigured into a series of audio samples but should not be used to illuminate a specific pixel in the display.

Figure 9:
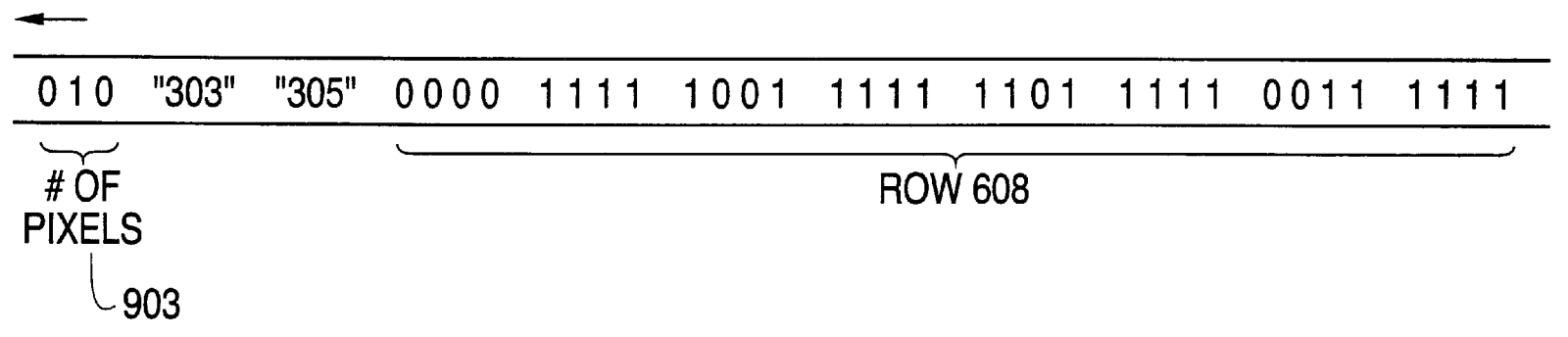

In a variation on the system described above, a bit pattern in a row of the memory map can be associated with more than one pixel of the display. For example, if pixels 303 and 305 are each to be illuminated according to the bit pattern shown in row 608, a multiplexer can multiplex the information as shown in FIG. 9. Here, a first portion of the marker identifies the number of pixels for which the corresponding bit pattern will be used. As shown in the example of FIG. 9, a 3-bit field can be used for this purpose, enabling up to 7 pixels to be illuminated according to a given bit pattern. As shown in FIG. 9, the indicator of the number of pixels 903 contains a pattern 010 which is a binary representation of the number 2. This pattern therefore indicates that two pixels will be illuminated according to the information contained in the bit pattern of row 608 so that the processor knows that the following data will provide the markers for two pixels. This pattern is then followed by the markers for pixels 303 and 305 (each represented, for example, by 15 bits or 17 bits in the full display examples discussed above), and the 32-bit pattern from row 608. The indicator 903 shown in FIG. 9 can also perform the function of the null marker if it contains a value of 000.

Figure 10:
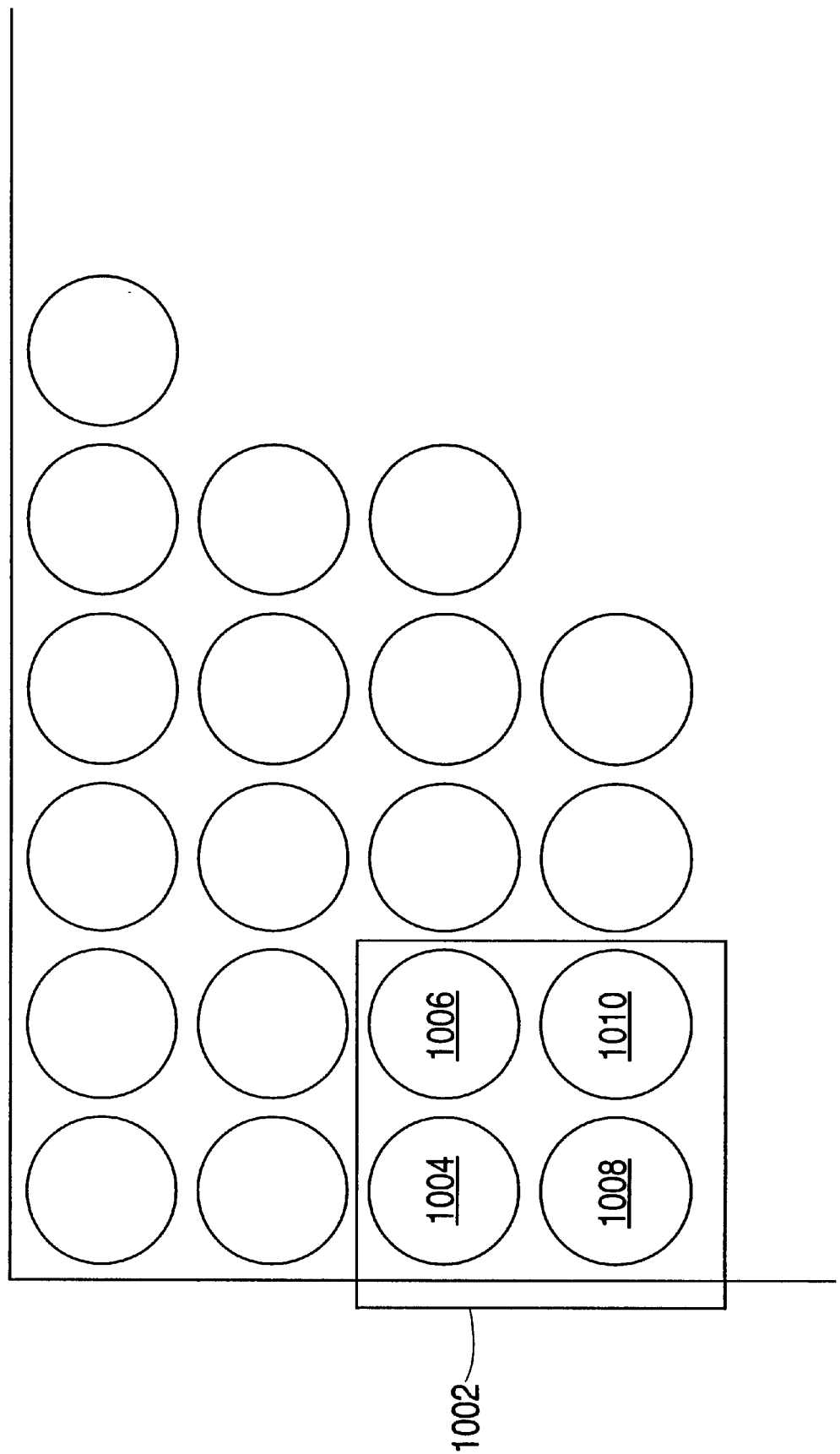
FIG. 10 shows an alternative view of a video display.

In an alternative embodiment, instead of associating an individual pixel with a corresponding bit pattern, a cluster of pixels can be associated with a corresponding bit pattern. For example, presuming conventional 16-bit video information is being used, a cluster of four pixels can be represented by a 64-bit stream. For example, the cluster 1002 shown in FIG. 10 consists of, by way of example, four pixels: 1004, 1006, 1008, and 1010. In a conventional display, having 360×240 pixels, if the pixels are divided into 4-pixel clusters, each pixel cluster could be identified by using 13-bits. Thus, in this example, 64 bits of data could be multiplexed with a 13-bit marker in order to identify a corresponding pixel cluster. Therefore, instead of sending four 16-bit words to identify the intensity and color associated with each pixel, the encoding scheme according to this embodiment would merely multiplex a 13-bit marker next to an appropriate 64 bit section of an audio stream in order to identify the bit pattern corresponding to the four pixels of the given pixel cluster. The 13-bit marker can further be expanded as discussed above regarding the first embodiment to include a bit to indicate the direction within the stream for the bits to be read and a logic sense for the bits of the stream. Such a strategy provides the same advantages as discussed above by allowing for faster processing to match each pixel cluster with a corresponding portion of the audio bit stream at the cost of adding additional overhead bits to the marker. Additionally, bits can be added to the marker to identify which of the pixels within the pixel cluster is the start pixel and to identify a pattern within the pixel cluster to be followed in associating 16-bit portions of the bit stream with each of the pixels in the cluster.

Figure 11:
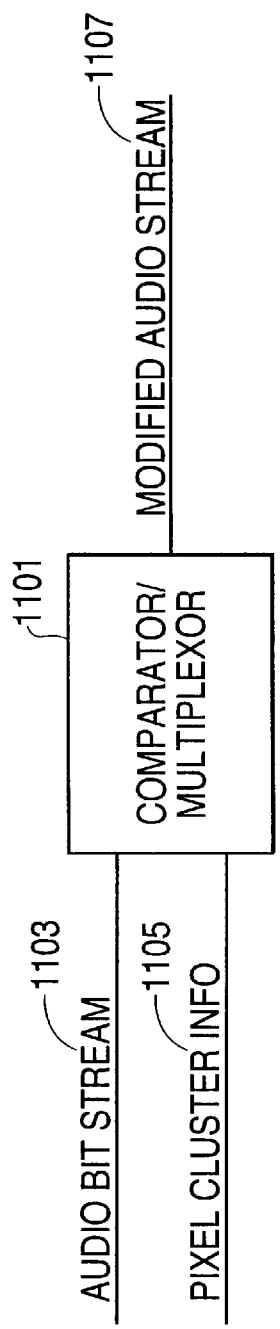
FIG. 11 shows a comparator/multiplexor according to the invention.
Figure 12:
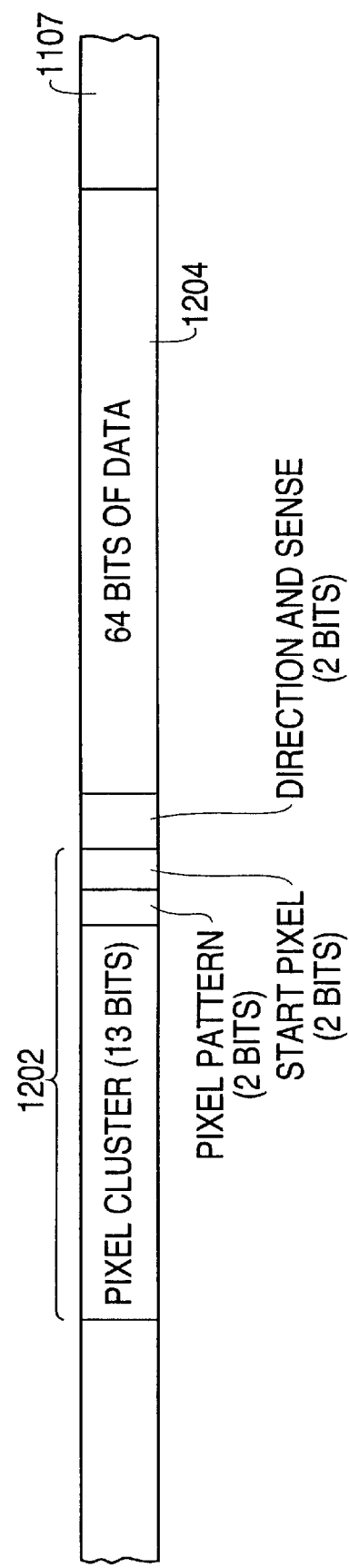
FIG. 12 shows an example of a modified audio bit stream produced by the comparator/multiplexor of FIG. 11.

FIG. 11 shows a comparator/multiplexer 1101 which receives the audio bit stream 1103 and pixel cluster information 1105 and creates therefrom the modified audio stream 1107. FIG. 12 shows an example of a modified audio stream 1107. Within audio stream 1107, upon recognition that a 64-bit pattern corresponds to cluster 1002, marker 1202 is multiplexed into the audio stream proximate to the 64 bits of data 1204. In this example, marker 1202 contains 19 bits. Thirteen bits of marker 1202 are used to identify pixel cluster 1002 from among the various pixel clusters within the display. In addition, two bits are used to identify the pixel pattern. For example, the 64 bits of data 1204, which can be viewed as four consecutive 16-bit portions each corresponding to one of the four pixels of pixel cluster 1002, will be allocated to the four pixels 1004–1010 of pixel cluster 1002 according to a specific pattern. This pattern can be a clockwise pattern, a counter-clockwise pattern, a FIG. 8 pattern, or any other pattern. Clearly, if more than four pixels are contained within each pixel cluster, the number of patterns which are possible increases. For a four-pixel cluster, a two-bit pattern indicator appears to be sufficient. Following the pixel pattern indicator, a two-bit start pixel indicator is provided to indicate which of the pixels 104–110 will be the first pixel to begin the pixel pattern. For example, if the pixel pattern indicator identifies a clockwise pattern, and the start pixel indicator identifies pixel 1010 as the start pixel, then the 64 bits of data in field 1204 will be allocated in the following manner: the first 16 bits will be allocated to pixel 1010, the next 16 bits will be allocated to pixel 1008, the next 16 bits will be allocated to pixel 1004, and the last 16 bits will be allocated to pixel 1006. Finally, as described earlier, marker 1202 can also include direction and sense bits in order to provide more possible pixel patterns and therefore increase the processing speed at the cost of additional bits in the marker.

The modified audio stream 1107 is thus processed by a receiving device to convert 64 bits of data into a portion of an analog audio signa, while the pixels of pixel cluster 1002 are illuminated according to the 64 bits of data, the pixel pattern indicator, the start pixel indicator and the direction and sense bits.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method of communicating a video image via an audio communication signal, comprising the steps of:

identifying, for a given pixel location of the video image, a set of samples within a stored audio signal having a corresponding bit pattern;

generating a marker identifying the location of the given pixel in the video image; and multiplexing the stored audio signal and the marker such that the marker appears within the stored audio signal proximate to the set of samples having the corresponding bit pattern.

2. A method as recited in claim 1, further comprising the steps of:

transmitting the multiplexed signal to a destination device;

demultiplexing, at the destination device, to recover the marker and the corresponding bit pattern;

illuminating a display at the given pixel location according to the corresponding bit pattern; and converting the corresponding bit pattern into an analog audio signal.

3. A method as recited in claim 1, wherein the identifying step is repeated for each pixel location of the image such that for each pixel location of the image a corresponding set of samples is identified, wherein the generating step is repeated for each pixel location of the image such that a marker is generated for each pixel location of the image, and wherein the multiplexing step is repeated for each pixel location of the image such that the marker generated for each pixel location of the image appears within the stored audio signal proximate to the corresponding set of samples.

4. A method as recited in claim 3, wherein each pixel location of the image is uniquely associated with its corresponding set of samples.

5. A method as recited in claim 3, wherein a set of samples having a particular bit pattern is associated with a plurality of pixel locations of the image which correspond to the particular bit pattern.

6. A method as recited in claim 1, further comprising the step of generating a null marker which appears proximate to a set of samples which does not have a corresponding bit pattern.

7. A method as recited in claim 2, further comprising the step of generating a null marker which appears proximate to a set of samples which does not have a corresponding bit pattern.

8. A method as recited in claim 3, further comprising the step of generating a null marker which appears proximate to each set of samples which does not have a corresponding bit pattern.

9. A method as recited in claim 5, further comprising the step of generating a count indicator, the count indicator identifying the number of pixel locations of the image associated with the particular bit pattern, the count indicator appearing proximate to the set of samples and the markers associated with the plurality of pixel locations.

10. A method as recited in claim 1, further comprising the step of generating a direction identifier identifying a direction of the bit pattern of the set of samples corresponding to the given pixel location.

11. A method as recited in claim 1, further comprising the step of generating a logic sense identifier identifying a logical sense of the bits of the bit pattern of the set of samples corresponding to the given pixel location.

12. A method of communicating a video image via an audio communication signal, comprising the steps of:

identifying, for a given pixel cluster location of the video image, a set of samples within a stored audio signal having a corresponding bit pattern;

generating a marker identifying the location of the given pixel cluster in the video image; and multiplexing the stored audio signal and the marker such that the marker appears within the stored audio signal proximate to the set of samples having the corresponding bit pattern.

13. A method as recited in claim 12, further comprising the step of generating a start pixel identifier identifying a pixel in the pixel cluster which is a start pixel, the start pixel corresponding to a first portion of the bit pattern.

14. A method as recited in claim 12, further comprising the step of generating a pattern identifier identifying a pattern in the pixel cluster, the pattern identifying an order in which pixels in the pixel cluster correspond to portions of the bit pattern.

15. A method as recited in claim 12, further comprising the step of generating a direction identifier identifying a direction of the bit pattern of the set of samples corresponding to the given pixel cluster.

16. A method as recited in claim 12, further comprising the step of generating a logic sense identifier identifying a logical sense of the bits of the bit pattern of the set of samples corresponding to the given pixel cluster.

17. A method of communicating a video image via an audio communication signal, comprising the steps of:

identifying, for a given pixel location of the video image, a portion of a bit stream of a digitized audio signal having a corresponding bit pattern;

generating a marker identifying the location of the given pixel in the video image; and multiplexing the digitized audio signal and the marker such that the marker appears within the bit stream.

18. A method as recited in claim 17, wherein the marker is positioned in the bit stream proximate to the portion of the bit stream identified in the identifying step.

* * * * *